United States Patent [19]
Chen

[11] Patent Number: 5,587,843
[45] Date of Patent: Dec. 24, 1996

[54] ZOOM LENS MECHANISM

[75] Inventor: Jim Chen, Taipei, Taiwan

[73] Assignee: Industrial Technology Research Institute, Hsinchu, Taiwan

[21] Appl. No.: 470,601

[22] Filed: Jun. 6, 1995

[51] Int. Cl.$^6$ .................................................. G02B 15/14
[52] U.S. Cl. .......................... 359/700; 359/829; 359/826
[58] Field of Search ..................................... 359/700, 701, 359/694, 823, 826, 829

[56] References Cited

U.S. PATENT DOCUMENTS

| | | | |
|---|---|---|---|
| 4,822,153 | 4/1989 | Tomori et al. | 359/700 |
| 5,144,494 | 9/1992 | Sekiguchi. | |

FOREIGN PATENT DOCUMENTS

| | | |
|---|---|---|
| 0275404 | 11/1990 | Japan. |
| 403180822 | 8/1991 | Japan. |

*Primary Examiner*—Georgia Y. Epps
*Assistant Examiner*—Thomas Robbins
*Attorney, Agent, or Firm*—W. Wayne Liauh

[57] ABSTRACT

An improved zoom lens mechanism is disclosed which allows the outer diameter of the zooming assembly to be reduced. It contains: (a) a focusing ring having a plurality of focusing pins; (b) a first barrel with longitudinal slots which is interconnected with a rear portion of the focusing ring, and contains a plurality of transverse slots at a front portion thereof respectively matching the positions of the focusing pins, the first barrel also contains a plurality of diametrically disposed longitudinal slots; (c) an outer ring disposed at the front portion the first barrel, the outer ring is provided with a plurality of second straight slots providing passages for the focusing pins; (d) an inner ring disposed at a rear portion of the outer ring, the inner ring is attached at a rear end of the first barrel, the inner ring is interconnected with the outer ring, both the inner and outer rings are provided with a plurality of beads; and each of the beads penetrates through the longitudinal straight slot; and (e) a second barrel with spiral slots which is disposed at an outer portion of the first barrel, the second barrel has a front end portion which is provided with a plurality of first contour holes for receiving respective beads disposed within an inner ring, the front portion of the second barrel is also provided with a second and third contour holes which are disposed adjacent to the first contour hole.

8 Claims, 5 Drawing Sheets

ZOOM LENS MECHANISM

BACKGROUND OF THE INVENTION

1. Field of the Invention

This invention relates to a lens mechanism, more particularly, to an improved zoom lens mechanism which can be readily assembled or disassembled. This zoom lens mechanism is specially suitable for LCD Projector System.

2. Description of the Prior Art

The zoom lens used on the commercial LCD Projector System can be classified into two categories, the standard lens and zoom lens. When the LCD Projector System is only incorporated with a standard lens, the projecting system shall be moved to a desired position to enlarge the screen, accordingly, a better effect can be reached.

When the LCD Projector System is equipped with a zoom lens, the user can select a suitable size of screen according to the environment. This projecting system equipped with zoom lens are specially suitable for the room is not robust. By virtue of this zoom lens, the projecting system can be fixed to a predetermined position to get a best effect.

Normally, the zoom lens includes a first and a second group of lens. According to the optical design of said lens, the diameter of first group of lens is larger than the diameter of second group of lens. Besides, the focus is based on the first group of lens. As shown in FIG. 1, a conventional configuration of a zoom lens which is disclosed in U.S. Pat. No. 5,144,494. According to its design, a first housing 18 is directly attached to the first group of lens 19 and the first housing 18 is screwed to the focusing ring 56. Besides, the end portion of said focusing ring 56 is screwed to lens barrel 57. As a result, the outer diameter as well as the length of said lens is inevitable increased.

The second and third housings 28, 38 are moved by the adjusting ring 58, ring gear 59 and cam ring 68. This axial movement of said adjusting ring 58 is anchored and transmitted to the barrel 67 which is interconnected with the second and third housings 28, 38. On the other hand, the cam ring 66 can be also adjusted by the manipulating ring 68 via the pin 67. This conventional lens has a very complicated configuration.

On the other hand, in adjusting the rear focus, a cam 77 is utilized to change the relative position of the adjusting ring 58 and the inner fixed barrel 67. Because the cam 77 has only an actuating point, it is difficult to adjust the rear focus, on the country, the relative position between said cam 77 and said inner fixed barrel 67 tends to shift tiltedly. Besides, during the adjustment, the cam ring 66 is moved directly up and down, accordingly, all the group lens are moved. In light of this, this need a more larger force in adjusting the group lens. No doubt this will bring an inconvenience to the user. An improvement is apparently necessary.

SUMMARY OF THE INVENTION

It is the object of this invention to provide a novel lens mechanism wherein the space received from the diameter difference between the first group of lens and second group of lens is utilized to provide a rearrangement of the elements. The convenience both in design of the lens configuration as well as the manipulation of said lens can be readily received from this new rearrangement. Accordingly, a compact, small and short lens mechanism is readily achieved. On the other hand, the assembly and disassembly between the lens and housing can be readily completed.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF PREFERRED EMBODIMENT

Figure 1:
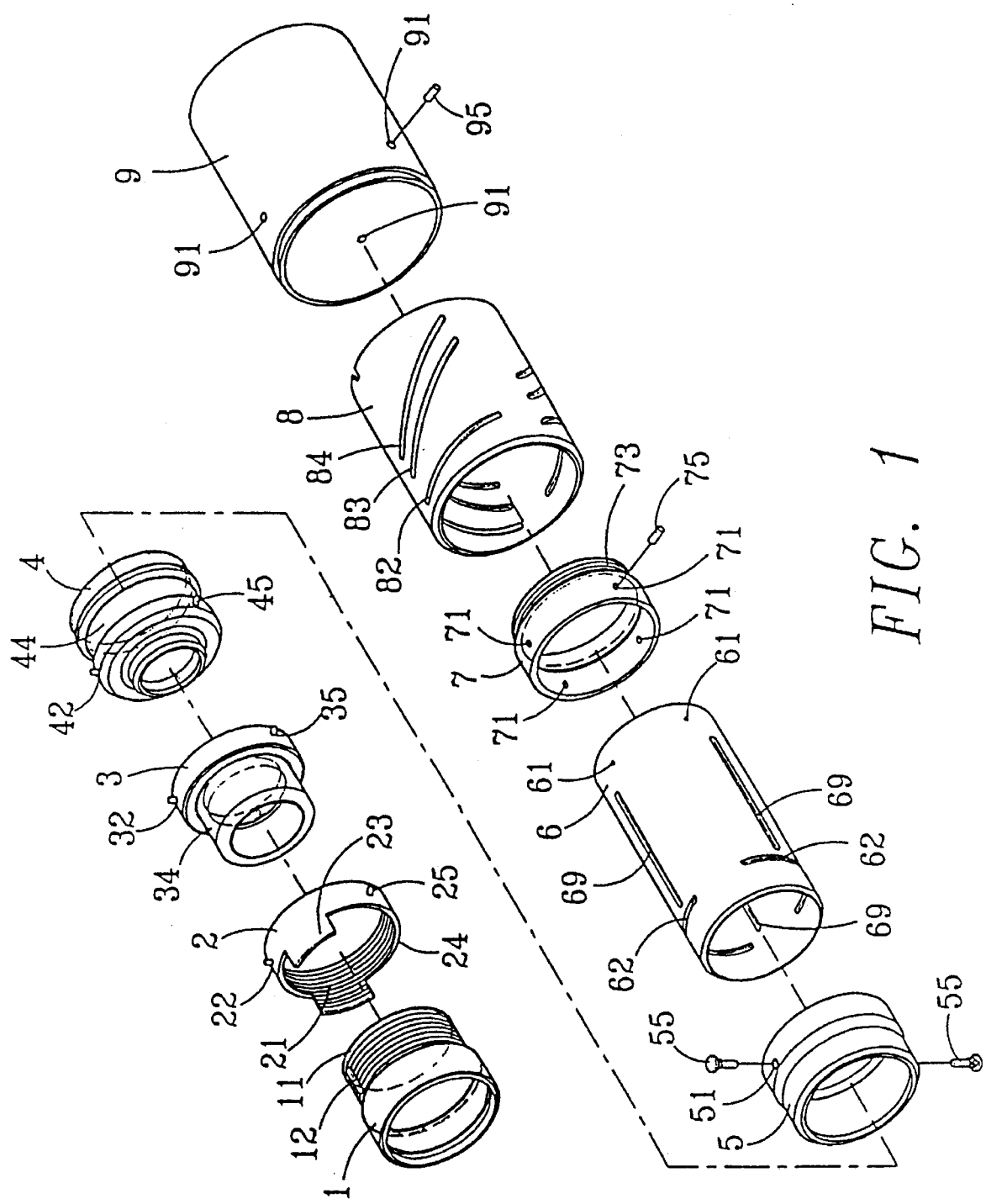
FIG. 1 is an exploded perspective view of the zoom lens mechanism made according to this invention.
Figure 2:
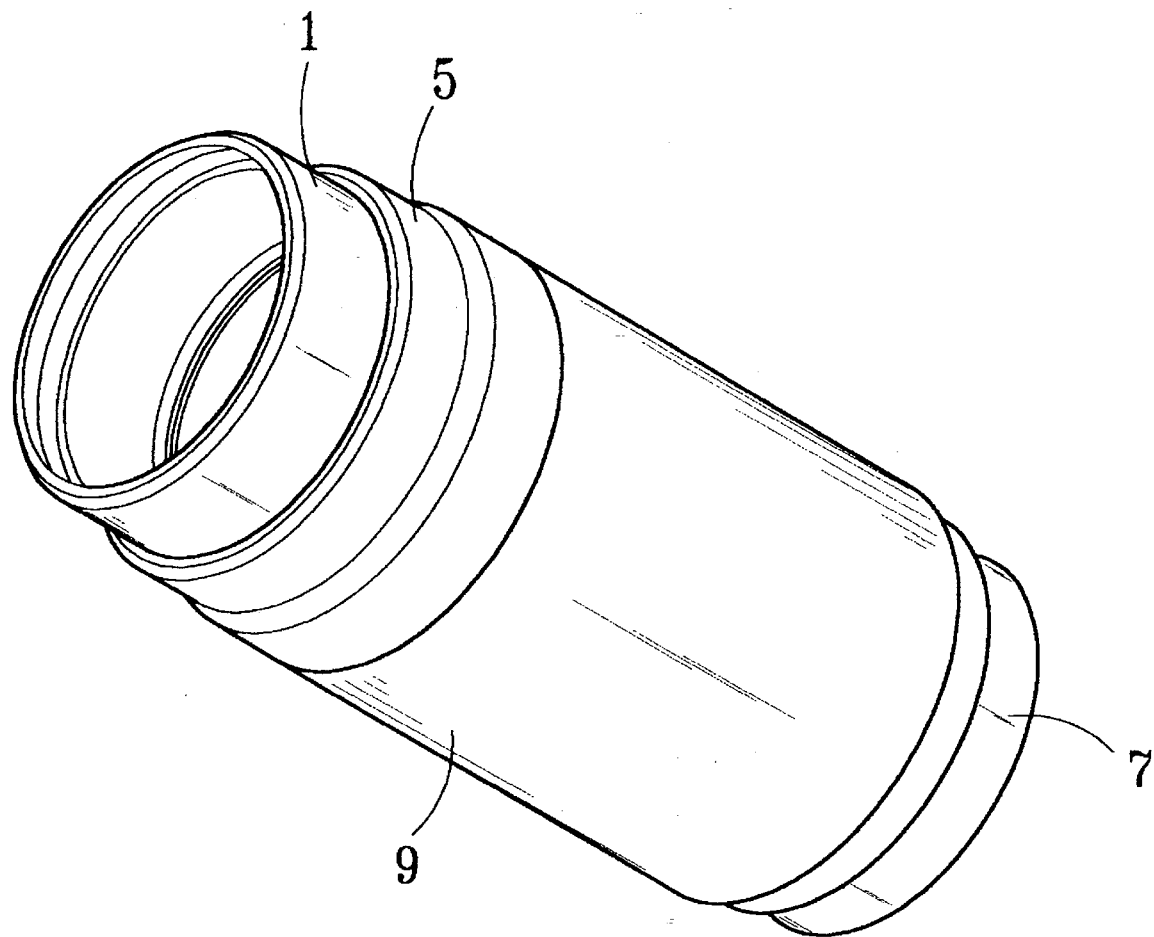
FIG. 2 is a perspective view of the zoom lens mechanism after assembled.

Referring to FIGS. 1 to 4, the zoom lens mechanism made according to this invention includes three portions, that are a focusing mechanism, zooming mechanism and rear focusing mechanism. These zoom lens mechanism includes an outer ring 1 and an inner ring 2, a second group barrel 3, a third group barrel 4, a focusing ring 5, a barrel 6 with longitudinal slot, a rear focusing ring 7, a barrel 8 with spiral slot, outer barrel 9 and body 99.

The outer ring 1 of the first group of barrel is provided with a plurality of lens 16 in the front half portion, the rear portion of said outer ring 1 is provided with threaded portion 11 (it can be double spiral thread as well). A longitudinal slot 12 is provided at the threaded portion 11 in such a manner that said threaded portion 11 is divided into two sectors, each of then has 180 degrees. Each of said lens 16 is installed within said outer ring 1 by means of stopper 17. The subject matter of the present invention has nothing with said lens, accordingly, no further description is given.

The inner ring 2 of said first group of barrel is provided with a projected rib 23 in the peripheral portion in such a manner that said ribs 23 are spaced by 180 degrees. A slot 23 is defined by two adjacent ribs 23. Said projected ribs 24 can be extended for increasing the jointing length with said outer ring 1. The inner portion of said inner ring 2 is provided with threaded portion 21 (it can be double spiral as well). The outer surface of said inner ring 2 is provided with a plurality of first jointing holes 22. Each of said first joint holes 22 is spaced with 120 degrees. Each of said first joint holes 22 is installed with a first bead 25 thereof.

The outer surface of said second barrel 3 is provided with a plurality of second joint holes 32. Each of said second joint holes 32 is spaced with 120 degrees and is provided with a second bead 35 thereof. Said barrel 3 is disposed with a plurality of lens 36 fixed by a plurality of stopper 37.

The outer surface of said third barrel 4 is provided with a plurality of third joint holes 42. Each of said third joint holes 42 is spaced with 120 degrees and is provided with a third bead 45 thereof. Said barrel 4 is disposed with a plurality of lens 46 fixed by a plurality of stopper 47.

The front portion of said barrel 6 with longitudinal slot is divided with traverse holes 62 spaced with 180 degrees. A plurality straight holes 69 are provided in the central portion, each of said holes is disposed between 120 degrees. A plurality of threaded holes 61 are disposed at the rear portion. Each of said threaded holes 61 is spaced with 90 degrees.

Said focusing ring 5 is attached to the front portion of said barrel 6 with longitudinal slot. Each of said focusing ring 5 and said barrel 6 is provided with threaded holes 51 in the jointing portion. Said threaded holes 51 are spaced with 180 degrees. A focusing pin 55 is disposed with respect to each of said threaded holes 51. Then, the upper threaded portion of said focusing pin 55 is screwed into said threaded holes 51. On the other hand, the lower post portion of said focusing pin 55 is inserted into the connecting portion between said inner ring 2 and said outer ring 1.

Said rear focusing ring 7 is attached to the rear end of said barrel 6 with longitudinal slot. Said rear focusing ring 7 is provided with threaded portion 73 at rear portion for screwing with said body 99. A plurality of long oval holes 71 are provided at the front portion of said rear focusing ring 7 in such a manner that each of said oval holes 71 is spaced with 90 degrees. The longitudinal length of said oval hole 71 is the amount of said rear focusing can be adjusted.

Said barrel 8 with spiral slot is provided with three groups of contour hole spaced with 120 degrees thereof. Each of said contour hole includes a first contour hole 82, a second contour hole 83 and a third contour hole 84. A plurality of threaded holes 85 are provided at suitable position and each of said threaded holes are spaced with 120 degrees.

Said outer barrel 9 is sleeved to the outer portion of said barrel 8 with longitudinal slot. A plurality of threaded holes 91 are provided and spaced with 120 degrees.

The focusing operation of the zoom lens mechanism made according to this invention is performed by the relative movement between said inner and said outer ring configured by said first group of barrel. In order to perform an easy adjustment manually, it is preferable that the adjusting element, i.e. focusing ring 5, is rotated it its pre-determined purely and directly, while not to be moved forward or backward with said outer ring of said first group of lens. In order to achieve a correct focusing, said focusing ring 5 can be simply rotated and the correct focusing is ensured. As disclosed above, each of said threaded holes 51 of said focusing ring 5 is disposed with a focusing pin 55 which further extends and inserts into said traverse slot 62 of said barrel 6 with longitudinal slot, at last, said focusing pin 55 is retained with said longitudinal slot 12 of said outer ring 1. Besides, said outer ring 1 is interconnected with said inner ring 2 by the help of said threaded portions 11 and 21 in such a manner that said beads 25 disposed within said first joint holes 22 are rotatably received within said straight holes 69 of said barrel 6 with longitudinal slot. Accordingly, said beads 25 are further received within said contour hole 82 of said barrel 8 with spiral slot.

During the focusing process, because said barrel 8 with spiral slot does not move, said inner ring 2 can be treated as a fixed part. By this arrangement, said outer ring 1 performs only rotation and liner movement to and fro. Because said barrel 6 with longitudinal slot is interconnected with said rear focusing ring 7 which is in turn interconnected with said body 99, consequently, said barrel 6 can be treated with a fixed part. On the other hand, since said focusing pin 55 of said focusing ring 5 is passing through said barrel 6 with longitudinal slot, and as retained by the length of said traverse slot 62 of said barrel 6, said focusing ring 5 can only perform a rotational movement radially within a pre-determined scope defined by the length of said traverse slot 62. As a result, said focusing ring 5 will not be moved with said outer ring 1 of said first group of lens barrel. In light of this, said outer ring 1 is provided with longitudinal slot 12 for axial compensation. Because said outer ring 1 is retained by said longitudinal slot 12, consequently, said outer ring 1 can move only within a predetermined scope. The falling off of said outer ring 1 during the focusing process can be beneficially prevented.

Figure 3:
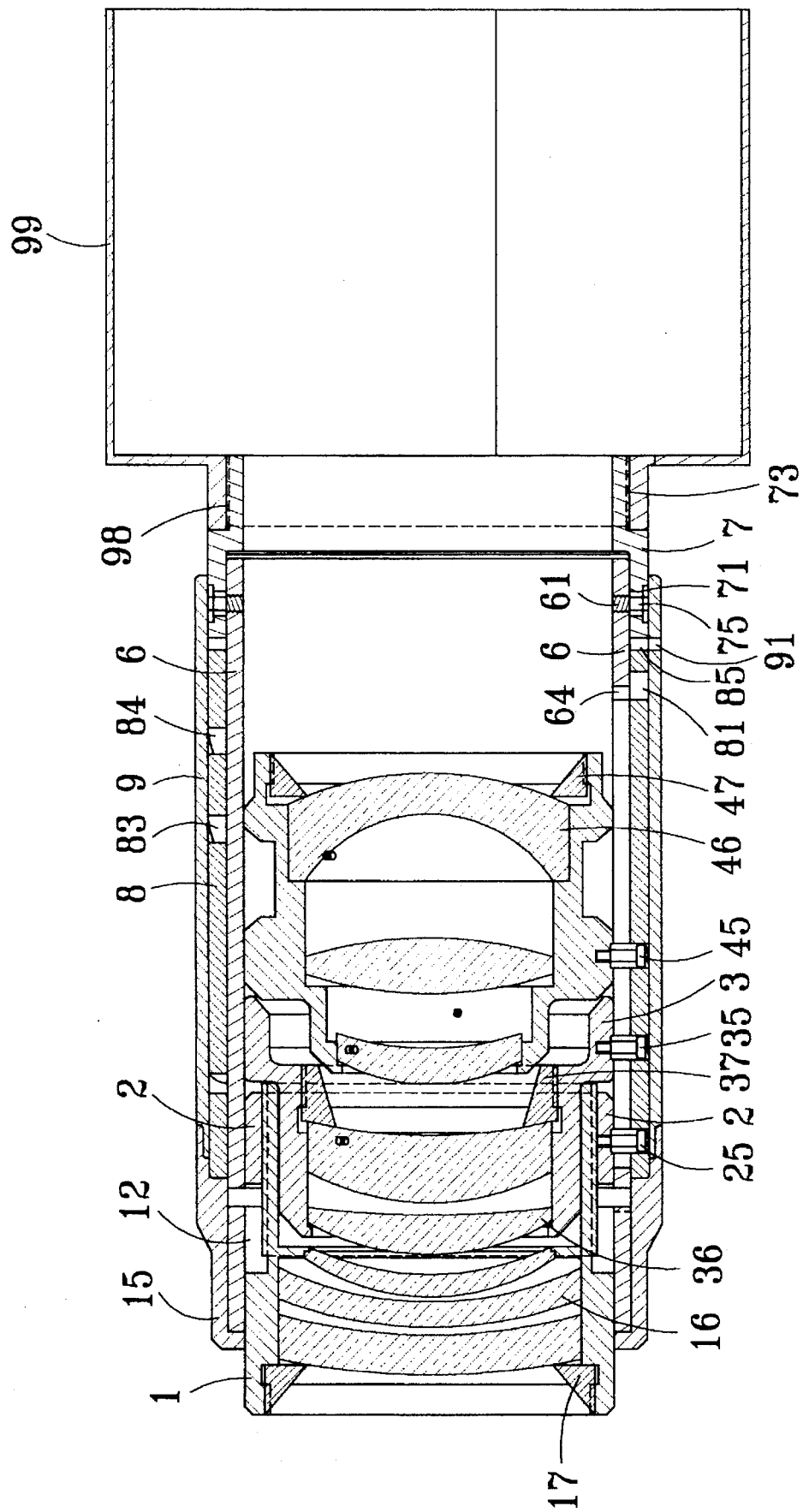
FIG. 3 is cross sectional view of the zoom lens mechanism made according to this invention, wherein the zoom lens is moved to a front dead point.
Figure 4:
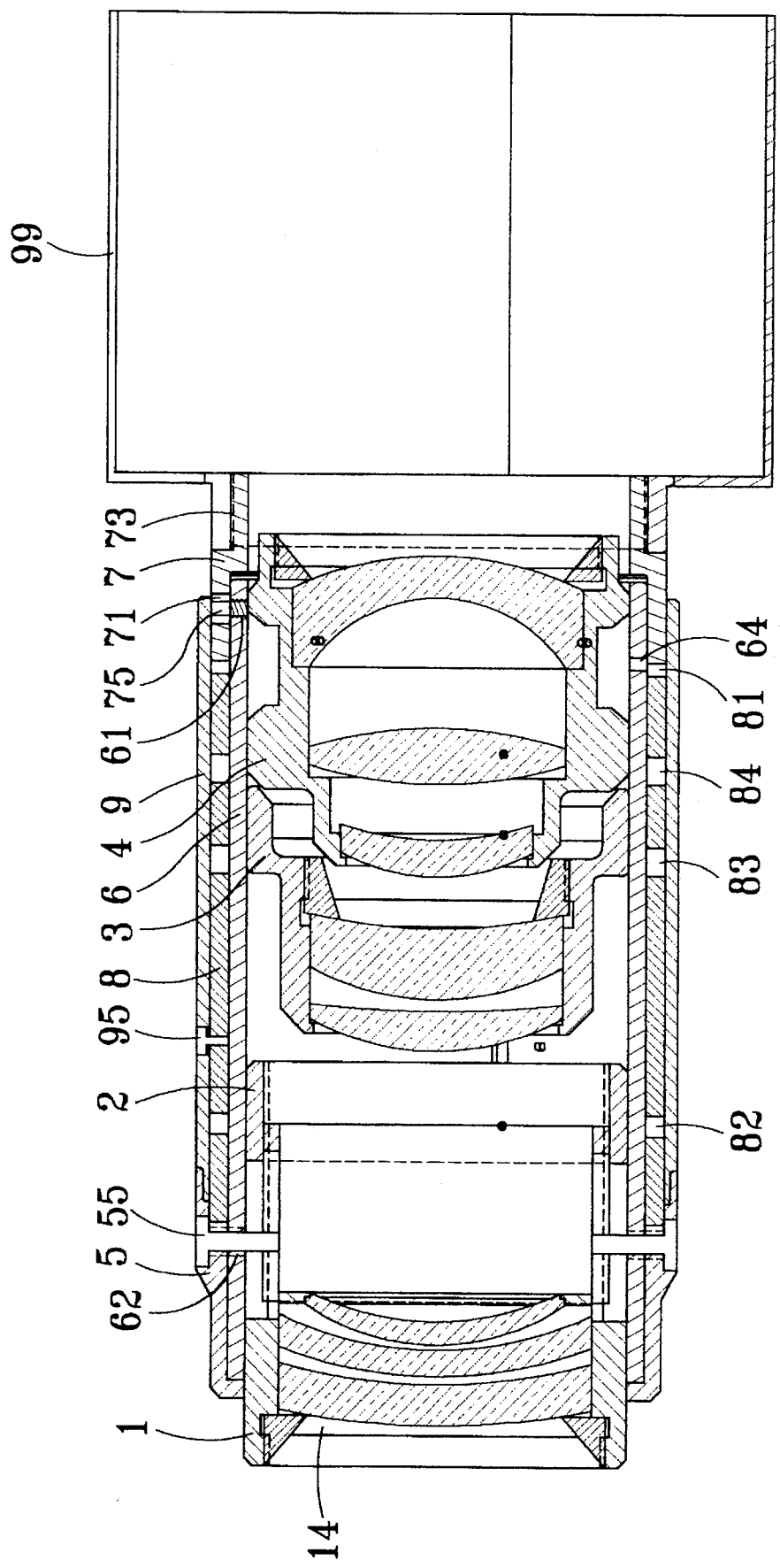
FIG. 4 is cross sectional view of the zoom lens mechanism similar to FIG. 3 and the lens is moved to a rear dead point.
Figure 5:
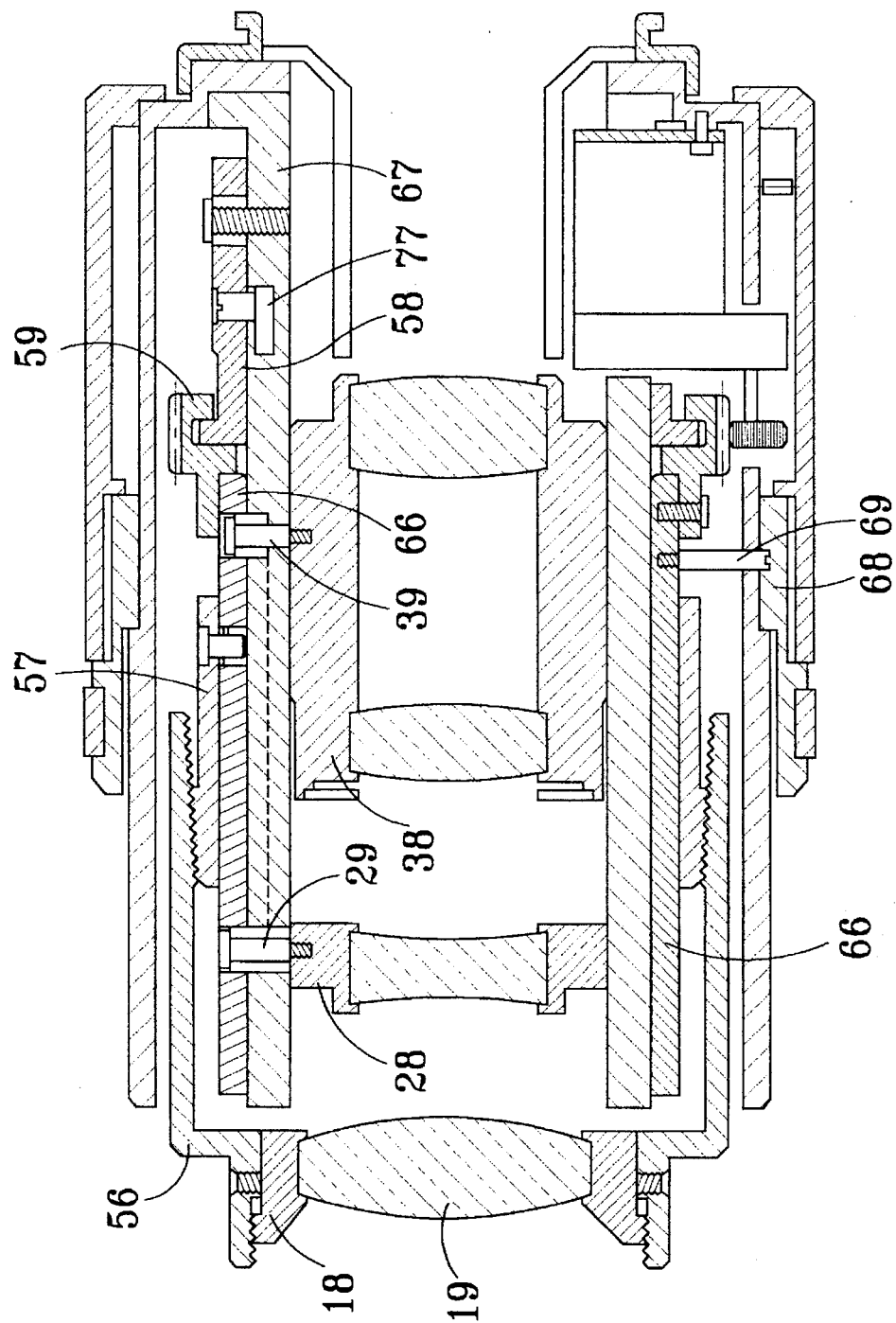
FIG. 5 is a conventional zoom lens mechanism.

The zooming operation of the present invention is performed and achieved by the limited relative movement of said inner and outer rings of said first group of barrel together with said second and third barrels along axial direction. The zooming process of the present invention is performed by the rotating movement of said outer barrel 9. Said barrel 9 is attached to said barrel 8 with spiral slot. The interconnection between said barrels 8 and 9 is achieved by three screws 95 locked between said threaded holes 85 of said barrel 8 with spiral slot and said threaded holes 91 of said outer barrel 9. On the other hand, said barrel 6 is installed within said barrel 8 with spiral slots. On the other hand, said outer and inner rings 1, 2 of said first group of barrel, said second group of barrel 3 and said third group of barrel 4 are disposed within said barrel 6. Said first contour hole 82 of said barrel 8 is installed with said first bead 25, said second contour hole 83 is installed with said second bead 35 and said third contour hole 84 is installed with a third bead 45. Each of said beads 25, 35, 45 are disposed with respective straight hole 69 of said barrel 6. On the other hand, said first bead 25 is also disposed within said joint hole 22 of said inner ring 2. Similarly, each of said second and third beads 35, 45 are disposed with their respective joint holes 32, 42. As mentioned above, said barrel 6 with longitudinal slot is a fixed element. When said outer barrel 9 is rotated, each of said beads 25, 35 and 45 is limited by the length and slope of their respective contour holes 82, 83 and 84 as well as the length of said straight hole 69, accordingly, the axial relative movement of said elements are changed as well. As a result, said outer ring 1 and said inner ring 2 of said first group of barrel, said second group of barrel 3 and said third group of barrel 4 are also moved and their relative position with respective to each other are also changed accordingly. When the movement is completed, a new focus is achieved. The front and rear dead point in zooming process are illustrated in FIGS. 3 and 4.

The rear focusing process of the zoom lens mechanism of the present invention is achieved in the following. Basically, the relative position of said three group of barrels are remained unchanged. Only the distance between said lens mechanism and said body shall be changed. The rear focusing mechanism is provided with a rear focusing ring 7. Said rear focusing ring 7 is provided with a threaded portion 73 at its rear portion and which is interconnected with said inner threaded portion 98 of said body 9. Said rear focusing ring 7 is attached at the rear end portion of said barrel 6 with longitudinal slot by the help of a screw 75 locked into said oval hole 71 located at front portion of said rear focusing ring 7 firstly, then locked into said threaded hole 61 of said barrel 6 with longitudinal slot. In adjustment, the zoom lens mechanism shall be dismounted firstly, then the screws 75 can be unscrewed with suitable screw driver, then the distance between said rear focusing ring 7 and said barrel 6 with longitudinal slot can be readily adjusted. When the desired distance is reached, said screw 75 can be locked again to fix said distance. Then the zoom lens assembly can be attached again to said body and the adjusting process is easily completed. On the other hand, by the simply rotate the zoom lens, the rear focus can be adjusted gradually and smoothly. In light of this, the rear focus is performed by moving the whole lens while not by the relative movement between elements. Accordingly, it can be readily manufactured and assembled.

Since the zoom lens mechanism is specially designed for projected TV set, accordingly, threaded portions are provided at rear focusing ring as well as the body. On the other hand, said threaded portion can be also modified to interconnected with other part of said body. As a result, when said outer barrel is rotated, said three group of lens are moved axially by the help of said barrel with spiral slot and said barrel of longitudinal slot. On the other hand, the rotation of said focusing ring will actuate said outer and inner rings to move backward and forward, as a result, a desired focus is reached. On the other hand, the rear focus can be readily adjusted by the relative movement between said rear focus ring and barrel with longitudinal slot. Because this unique design, the overall diameter of said lens mechanism is beneficially reduced.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An improved zoom lens mechanism, including:

a focusing ring having a plurality of focusing pins;

a first barrel with longitudinal slots, said first barrel is interconnected with a rear portion of said focusing ring, and contains a plurality of transverse slots at a front portion thereof respectively matching said focusing pins, said first barrel also contains a plurality of longitudinal slots, generally diametrically opposing each other;

an outer ring which is disposed at the front portion said first barrel, said outer ring is provided with a plurality of straight slots providing passages for said focusing pins;

an inner ring which is disposed at a rear portion of said outer ring, said inner ring is attached at a rear end of said first barrel, said inner ring is interconnected with said outer ring, both said inner and outer rings are provided with a plurality of beads; and each of said beads can penetrate through said longitudinal slots of said first barrel;

a second barrel with spiral slots which is disposed at an outer portion of said first barrel, said second barrel has a front end portion which is provided with a plurality of first contour holes for receiving respective beads disposed within said inner ring, said front portion of said second barrel is also provided with a second and third contour holes which are disposed adjacent to said first contour hole;

a third barrel which is provided with a plurality of beads at a surface thereof, each of said beads can penetrate through said longitudinal slots of said first barrel and be received by said second contour holes of said first barrel; and a fourth barrel which is provided with a plurality of beads at its surface, each of said beads can penetrate through said longitudinal slots of said first barrel and be received within said third contour holes of said first barrel;

whereby the provisions of said longitudinal straight slots diametrically provided at said first barrel, and said second barrel with said spiral slots and said contour holes allow an outer diameter of said lens mechanism to be reduced.

2. A zoom lens mechanism as recited in claim 1, which further contains an outer barrel sleeved onto said second barrel with said spiral slots.

3. A zoom lens mechanism as recited in claim 2, which further contains a plurality of threaded holes provided at said outer barrel.

4. A zoom lens mechanism as recited in claim 1, wherein said outer ring is interconnected with said inner ring at said rear end portion of said outer ring.

5. A zoom lens mechanism as recited in claim 1, which further contains a rear focusing ring attached at said rear end of said first barrel.

6. A zoom lens mechanism as recited claim 5, which further contains a plurality of straight holes at a front portion of said rear focusing ring, and a screw means for locking said straight holes at said front portion of said rear focusing ring with respective threaded holes of said outer barrel.

7. A zoom lens mechanism as recited in claim 5, wherein said rear focusing ring is interconnected to a lens body.

8. A zoom lens mechanism as recited in claim 7, wherein said rear focusing ring is interconnected with a front portion of said lens body at a rear end portion of said rear focusing ring.

* * * * *